US012571933B2

(12) United States Patent
Vasconcelos De Almeida

(10) Patent No.: US 12,571,933 B2
(45) Date of Patent: Mar. 10, 2026

(54) APPROACH DETECTION DEVICE

(71) Applicant: Continental Automotive Technologies GmbH, Hannover (DE)

(72) Inventor: Joao Carlos Vasconcelos De Almeida, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 65 days.

(21) Appl. No.: 18/683,056

(22) PCT Filed: Aug. 17, 2022

(86) PCT No.: PCT/EP2022/073009
§ 371 (c)(1),
(2) Date: Feb. 12, 2024

(87) PCT Pub. No.: WO2023/021114
PCT Pub. Date: Feb. 23, 2023

(65) Prior Publication Data
US 2025/0138214 A1      May 1, 2025

(30) Foreign Application Priority Data

Aug. 19, 2021    (FR) ...................................... 2108763
Nov. 22, 2021    (FR) ...................................... 2112322

(51) Int. Cl.
*G01V 3/12*        (2006.01)
*G06K 7/10*        (2006.01)
*G06K 19/077*      (2006.01)

(52) U.S. Cl.
CPC ........... *G01V 3/12* (2013.01); *G06K 7/10237* (2013.01); *G06K 19/07777* (2013.01); *G06K 7/10336* (2013.01)

(58) Field of Classification Search
CPC ... G01V 3/12; H04B 5/26; H04B 5/24; H04B 5/43; G06K 19/07777; G06K 7/10237;
(Continued)

(56) References Cited

U.S. PATENT DOCUMENTS

2004/0137844 A1*   7/2004   Desjeux ............... G06K 7/0008
                                                         455/127.1
2009/0015383 A1*   1/2009   Stewart .................... H01Q 7/08
                                                         340/10.3
(Continued)

FOREIGN PATENT DOCUMENTS

CN        206878171 U      1/2018
CN        110601726 A      12/2019
(Continued)

OTHER PUBLICATIONS

International Search Report and Written Opinion for International Application No. PCT/EP2022/073009, mailed Nov. 18, 2022, 17 pages.
(Continued)

*Primary Examiner* — Raul J Rios Russo
(74) *Attorney, Agent, or Firm* — Buchanan Ingersoll & Rooney PC

(57) ABSTRACT

A device for detecting an approach of a part of a user's body and/or of a portable user equipment, housed on board a motor vehicle, including: a near-field communication antenna configured to transmit and receive signals at a high resonant frequency between 3-30 MHz. The antenna includes at least one winding extending continuously in the form of a set of rods such that the rods have a variable capacitance connected to the antenna and the antenna is able to generate a capacitance variation in response to the approach of a part of a user's body; a measurer for measuring, through electromagnetic coupling with the antenna, an impedance variation or a frequency variation of the antenna.

(Continued)

The measurer having a series resonant frequency at the selected high resonant frequency and able to detect the approach of a portable user equipment or the approach of a part of the user's body.

12 Claims, 4 Drawing Sheets

(58) Field of Classification Search
CPC .......... G06K 7/10336; G06K 7/10346; G06K 7/10415; G01R 27/26; G01R 27/2611; G01R 27/267
USPC ......................................................... 324/654
See application file for complete search history.

(56) References Cited

U.S. PATENT DOCUMENTS

| | | | | |
|---|---|---|---|---|
| 2012/0004851 | A1* | 1/2012 | Potyrailo | ........... G01N 33/0073 |
| | | | | 702/65 |
| 2013/0244577 | A1 | 9/2013 | Cheikh | |
| 2014/0354411 | A1* | 12/2014 | Pudenz | ................ H01Q 9/0407 |
| | | | | 343/700 MS |
| 2016/0119033 | A1* | 4/2016 | Tudose | .................... H04B 5/45 |
| | | | | 340/10.1 |
| 2019/0376325 | A1 | 12/2019 | Siguier et al. | |
| 2021/0066802 | A1 | 3/2021 | Liu et al. | |
| 2021/0122334 | A1 | 4/2021 | Spick et al. | |
| 2021/0175930 | A1 | 6/2021 | Vassilieff et al. | |
| 2022/0042853 | A1* | 2/2022 | Assadi | ...................... G01T 1/00 |

FOREIGN PATENT DOCUMENTS

| | | |
|---|---|---|
| CN | 211046573 U | 7/2020 |
| EP | 2006952 A1 | 12/2008 |
| EP | 3197061 A2 | 7/2017 |
| FR | 3 027 400 A1 | 4/2016 |
| KR | 20140119534 A | 10/2014 |

OTHER PUBLICATIONS

International Search Report and Written Opinion for International Application No. PCT/EP2022/073009, mailed Nov. 18, 2022, 14 pages (French).

French Search Report for French Application No. 2112322, dated Aug. 9, 2022 with translation, 10 pages.

Office Action (First Office Action) issued Nov. 29, 2025, by the National Intellectual Property Administration, P. R. China in corresponding Chinese Patent Application No. 202280056635.6 and an English translation of the Office Action. (26 pages).

* cited by examiner

APPROACH DETECTION DEVICE

CROSS REFERENCE TO RELATED APPLICATIONS

This application is the U.S. National Phase Application of PCT International Application No. PCT/EP2022/073009, filed Aug. 17, 2022, which claims priority to French Patent Application No. 2108763, filed Aug. 19, 2021, and French Patent Application No. 2112322, filed Nov. 22, 2021, the contents of such applications being incorporated by reference herein.

FIELD OF THE INVENTION

The invention relates to an approach detection device. The invention is applicable more particularly to the detection of an approach of a hand and/or of a smartphone toward a bodywork element of a motor vehicle such as for example a handle of an opening element or a pillar of an opening element (door or trunk) in order to unlock the opening element, or toward an inductive cellphone charger that is housed on board motor vehicles in order to charge the cellphone.

BACKGROUND OF THE INVENTION

Nowadays, vehicle door handles are equipped with devices for detecting an approach of a hand of a user or of a smartphone. The detection of an approach of and/or of contact by part of the user's body, for example the hand of a user, on the handle, coupled with the recognition of a portable user equipment, for example a "hands-free" electronic fob for remote access control, carried by said user, makes it possible to lock and unlock the opening elements of the vehicle. Thus, when the user, carrying the corresponding electronic fob identified by the vehicle, wishes to unlock the vehicle, they touch the door handle of the vehicle, and this then actuates an electric door release in the lock of the one or more opening elements of the vehicle, which is/are then automatically unlocked. By approaching or by pressing on a precise location on the door handle of the vehicle, called the "unlocking zone", the door (or alternatively all of the opening elements) is (are) unlocked without any other action by the user. Conversely, when the user, still carrying the necessary fob identified by the vehicle, wishes to lock their vehicle, they close the door of their vehicle and press momentarily on another precise location of the handle, called the "locking zone". This gesture makes it possible to automatically lock the opening elements of the vehicle.

These devices for detecting an approach of a hand for the purpose of unlocking/locking generally comprise two capacitive sensors, in the form of two electrodes that are electrically connected to a printed circuit, each integrated in a precise locking or unlocking zone in the door handle. Generally, one electrode is dedicated to each zone, that is to say one electrode is dedicated to detecting the approach of and/or contact by the hand of the user in the locking zone and one electrode is dedicated to detecting the approach of and/or contact by the hand of the user in the unlocking zone. This device for detecting an approach of a hand furthermore comprises a radiofrequency, generally LF (low-frequency), antenna, although this antenna may also be a high-frequency or ultra-high-frequency antenna of UWB, BLE, Wi-Fi, 4G, 5G etc., type, or of NFC (near-field communication) type, that is to say any antenna or communication device for exchanging an identifier with the cellphone in order to authenticate it.

The detection device also comprises a vehicle electronic computer (ECU: abbreviation for "electronic control unit") that receives a presence detection signal from the capacitive sensors. The vehicle electronic computer has identified the user beforehand as being authorized to access this vehicle, or alternatively, it carries out this identification after receiving this presence detection signal. To this end, it sends an identification request via the radiofrequency antenna to the fob (or remote controller) carried by the user. This fob responds by sending its identification code to the vehicle electronic computer via RF (radiofrequency) waves or NFC, or UWB, or Wi-Fi, or BLE, etc. If the electronic computer recognizes the identification code as the one authorizing access to the vehicle, it triggers the locking/unlocking of the door (or of all of the opening elements). However, if the electronic computer has not received an identification code, or if the received identification code is incorrect, the locking or unlocking does not take place.

When the approach of a smartphone is to be detected, the detection device rather comprises an NFC ("near-field communication") reader, which is known per se, so as to detect, by radiofrequency exchange at 13.56 MHZ, the presence of a smartphone in the vicinity, the smartphone also being equipped with near-field communication means and being able to receive the identifier of said telephone in order to ensure that it is correctly recognized as being paired with the vehicle and thus carry out the locking/unlocking. This NFC reader is connected to a dedicated microcontroller.

Such vehicles are therefore equipped with door handles comprising a detection device equipped with a radiofrequency antenna, with two electrodes connected to a first capacitive detection microcontroller dedicated to the detection of an approach of a hand, and with an NFC reader, itself connected to a second microcontroller dedicated to the detection by NFC of a smartphone, all being integrated into a printed circuit.

However, the integration of all these electronic components poses a problem in terms of space taken up in the door handle, and entails non-negligible added costs. Furthermore, NFC detection is not reliable when smartphones contain very little metal, for example when they have plastic shells, or when the portable access device is a "tag", that is to say a fob consisting almost entirely of plastic.

SUMMARY OF THE INVENTION

An aspect of the invention therefore proposes a detection method as well as an associated device for overcoming the drawbacks of the prior art. More particularly, an aspect of the invention proposes a simple and inexpensive device for detecting both the approach of a hand and the approach of a smartphone using only NFC technology, that is to say near-field communication.

An aspect of the invention relates to a device for detecting an approach of a part of a user's body or of a portable user equipment, intended to be housed on board a motor vehicle, noteworthy in that it comprises:

a. a near-field communication antenna configured to transmit and receive signals at a high resonant frequency selected between 3 and 30 MHZ, said antenna comprising at least one winding that extends continuously in the form of a set of comb-shaped rods such that said rods have a variable capacitance connected to said antenna and that said antenna is able to generate a variation in capacitance in response to the approach of a part of a user's body, b. measuring means for measuring, through electromagnetic coupling with said antenna, a variation in impedance or a variation in frequency of said antenna, the measuring means having a series resonant frequency at the selected high resonant frequency and being able to detect the approach of a portable user equipment or the approach of a part of the user's body.

In one preferred embodiment of the invention, the winding defines a perimeter within which said antenna extends continuously in the form of a set of comb-shaped rods.

The perimeter may be rectangular, and the rods may be in the form of copper tracks perpendicular to a length or width of the perimeter.

Advantageously, the rods are identical to one another.

Expediently, said antenna comprises rods on two opposing sides of the perimeter.

Preferably, said antenna comprises at least one winding that extends continuously in the form of a set of comb-shaped rods such that said rods have a variable capacitance connected in parallel to said antenna.

Advantageously, the measuring means comprise a second antenna electromagnetically coupled to the communication antenna.

Expediently, the device comprises a third antenna connected in series to the communication antenna and electromagnetically coupled to the second antenna.

An aspect of invention relates to a vehicle door handle, or an inductive charger, or even a rear-view mirror, noteworthy in that it comprises a detection device according to any one of the features listed above.

Finally, an aspect of the invention is applicable to any motor vehicle, noteworthy in that it comprises a detection device according to any one of the features listed above.

BRIEF DESCRIPTION OF THE DRAWINGS

Further features and advantages of aspects of the invention will become more clearly apparent upon reading the following description. This description is purely illustrative and should be read in conjunction with the appended drawings, in which.

DETAILED DESCRIPTION OF THE PROFFERED EMBODIMENTS

Figure 7:
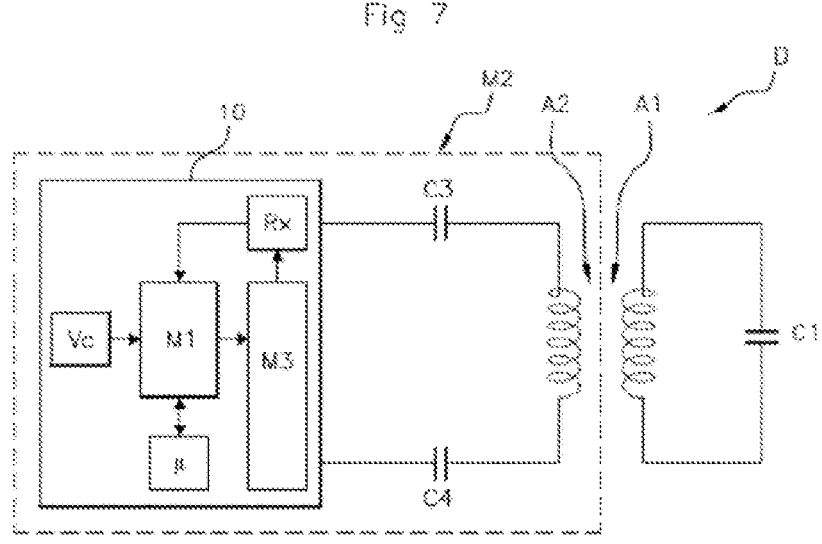
FIG. 7 is a schematic representation of the detection device according to an aspect of the invention.

The device D for detecting an approach of a body part of a user and of a portable user equipment is illustrated in FIG. 7.

The device D comprises a near-field communication antenna A1, having a parallel resonant frequency selected between 3 and 30 MHZ, for example at 13.56 MHZ, able to detect and communicate with a portable user equipment, for example a smartphone or a fob (also called a "tag") equipped with NFC communication technology. This type of NFC antenna A1 is associated with a microprocessor and with software or other electronic means in order to be able to exchange data with the portable user equipment.

The detection of an approach of a portable user equipment toward the detection device D is achieved by measuring the variation in impedance or variation in frequency of the NFC antenna A1 by way of measuring means M2.

The measuring means M2 determine, through electromagnetic coupling with said NFC antenna A1, a variation in impedance or a variation in frequency of said NFC antenna A1.

To this end, and according to an aspect of the invention, the measuring means M2 comprise a second antenna A2, and have a series resonant frequency equal to the selected parallel resonant frequency of the communication antenna A1, that is to say around 13.56 MHz, and are able to detect the approach of a portable user equipment 200 or the approach of a part of the user's body, for example a hand M toward the device D, as will be explained below.

An aspect of the invention proposes for the antenna A1 to comprise at least one winding E1, E2, E3 and for it to extend continuously in the form of at least one set of comb-shaped rods O1, O2 . . . Oi, and N1, N2 . . . Ni which, as explained below, act as a detection electrode by creating a variable capacitance C1.

The term "rods" refers to tracks in the form of copper, having a predetermined width, for example flattened wires or copper strips, which are connected to one another and which constitute notches, protrusions, protuberances or extensions of the NFC antenna A1, which itself consists of a copper track.

The NFC antenna A1 may comprise a plurality of windings E1, E2, E3 of square, rectangular, oval or round shape.

Figure 1:
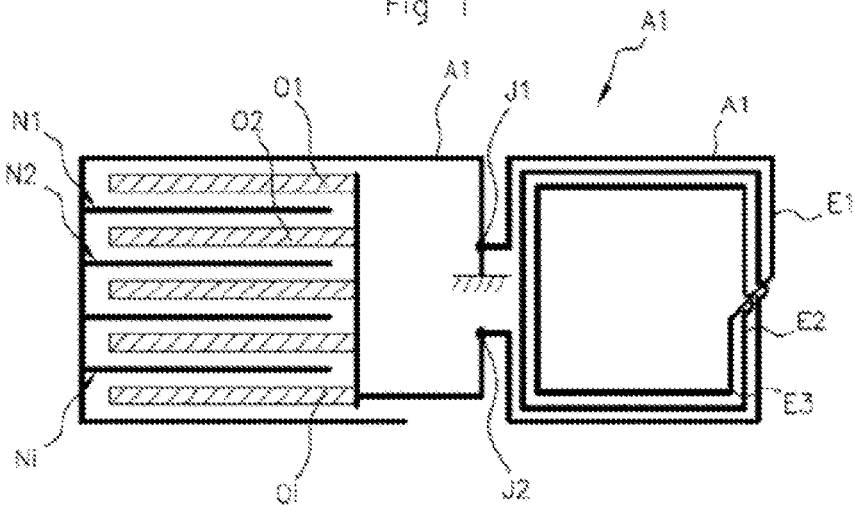
FIG. 1 is a schematic representation of a first embodiment of the communication antenna of the approach detection device according to the invention.
Figure 5:
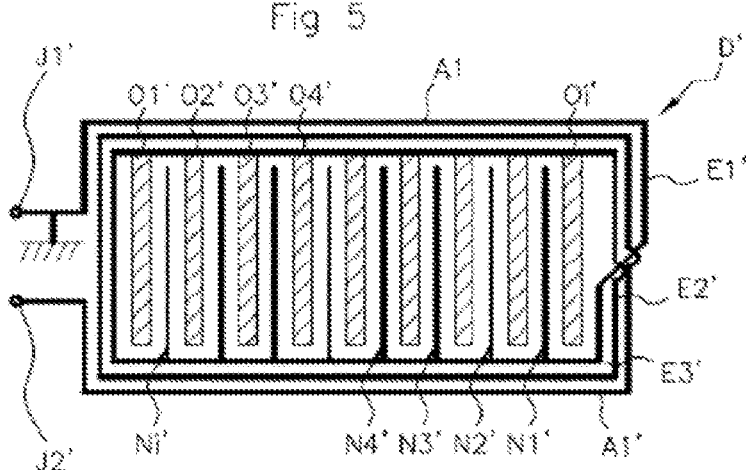
FIG. 5 is a schematic representation of a second preferred embodiment of the detection device according to the invention.
Figure 6:
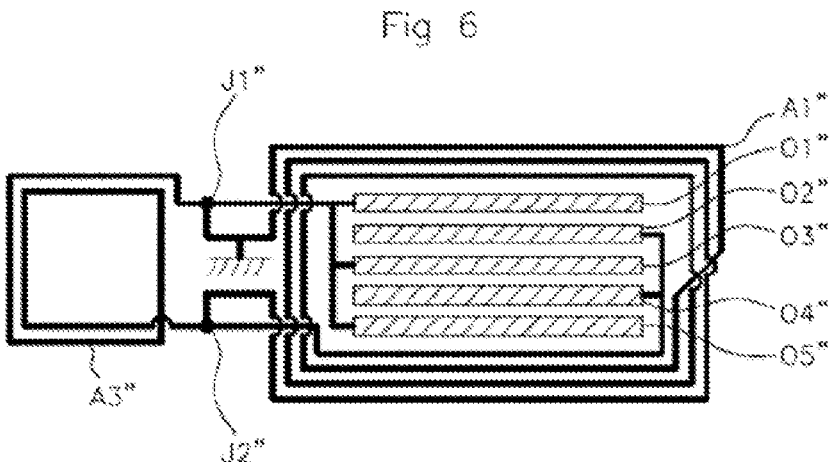
FIG. 6 is a schematic representation of one preferred embodiment of the detection device according to the invention.

In FIGS. 1, 5 and 6, for explanatory purposes only, there are three windings E1, E2, E3 of the NFC antenna A1, these being shown in a rectangular shape, without this being limiting.

In FIG. 1, according to the first embodiment, the NFC antenna A1 comprises three windings E1, E2, E3. The NFC antenna A1 is extended by way of two connections J1, J2 forming two sets of rods O1, O2, . . . Oi and N1, N2, . . . Ni. In this example, the rods O1, O2, . . . . Oi or N1, N2, . . . Ni of each respective set are identical to one another, and all the rods of the two sets are parallel to one another. In this first embodiment, the set of conductive metal rods connected in parallel to the NFC antenna A1 constitutes a set of conductive surfaces acting as an electrode with a variable capacitance C1, as detailed below.

Of course, the rods O1, O2, . . . Oi and N1, N2, . . . Ni may be inclined along an axis parallel to a length or width of a rectangular winding of the NFC antenna A1, and said rods may be of different widths from one another, and/or of different geometries from one another, and/or with spacings of different widths from one another.

In a second embodiment of the detection device D' according to the invention, but which is in no way limiting, the one or more windings E1', E2', E3' define(s) a perimeter within which said NFC antenna A1' extends continuously in the form of at least one set of comb-shaped rods, in this example two sets of rods O1', O2', O3' . . . Oi', and N1', N2', N3' . . . Ni', each of the sets being comb-shaped, this being illustrated in FIG. 5.

In FIG. 5, according to the second embodiment of the invention, inside a rectangular perimeter defined by the windings E1' E2', E3' of the NFC antenna A1'; the NFC antenna A1' comprises two sets of rods O1', O2' . . . Oi'; or N1', N2', N3' . . . Ni' each resembling a comb. Each of the two sets O1', O2' . . . Oi'; or N1', N2', N3' . . . Ni' is perpendicular to a length of the perimeter and the two sets O1', O2' . . . Oi'; or N1', N2', N3' . . . Ni' are each located on opposing sides of the perimeter. Each rod O1', O2' . . . Oi'; of the first set is interleaved with a rod of the second set N1', N2', N3' . . . Ni'.

The NFC antenna A1, A1', A1" is grounded on one of its sides, for example at the points J1, J1' and J1" as illustrated in FIGS. 1, 5 and 6.

Similarly, in this second embodiment, the set of rods constitutes a conductive surface acting as a variable capacitance C1.

In order to detect the approach of a hand M of a user or of a portable user equipment 200, the detection device D moreover comprises, as already mentioned, measuring means M2 that are able to measure a variation in impedance or a variation in frequency of said NFC antenna A1.

The measuring means M2 are illustrated in FIG. 7. Said measuring means M2 comprise: a voltage source Vc, an NFC driver M1 connected to a microcontroller u, and then a matching circuit M3 comprising at least one EMC (electromagnetic compatibility) filter and means for adjusting the impedance and the frequency of the coupled NFC antenna A1, in the form of two capacitors C3 and C4 that are connected to the second antenna A2. The measuring means M2 also comprise a receiver circuit Rx dedicated to receiving data from the NFC antenna A1. The two capacitors C3 and C4 are matching capacitors for creating a series resonance in the circuit of the measuring means M2, and more particularly for the second antenna A2, by lowering its impedance to the desired resonant frequency. Thus, through electromagnetic coupling between the NFC antenna A1 and the second antenna A2, any variation in the parallel resonant frequency and/or impedance of the circuit formed by the NFC antenna A1 and the electrode with variable capacitance C1 may be measured by the measuring means M2.

Said measuring means M2 are separate and disconnected from the NFC communication antenna A1. The NFC communication antenna A1 and the second antenna A2 are placed facing one another so as to create electromagnetic coupling between the two antennas A1, A2. With the measuring means M2 having a series resonant frequency substantially equal to the resonant frequency F of the NFC communication antenna A1, any variation in impedance or in resonant frequency of the NFC communication antenna A1 caused by the approach of a hand M of a user or the approach of a portable user equipment 200 is transmitted inductively to the second antenna A2.

The measuring means M2 for measuring the variation in impedance or variation in frequency comprise for example software means contained within an NFC driver M1 and measure any variation in the phase, in the current or in the voltage of the second antenna A2 brought about by the variation in impedance or in resonant frequency of the NFC antenna A1. More precisely, any change in impedance or in frequency of the NFC antenna A1 due to the approach of a portable equipment 200 or of a hand M of a user has an effect on the second antenna A2 and is measured by the measuring means M2.

The NFC communication antenna A1 modified in this way compared to the prior art, by virtue of the sets of conductive metal rods, has a variable capacitance C1 that is significantly greater than the NFC antenna from the prior art, which makes it sensitive, inter alia, to the approach of a hand M, but also to the approach of any object.

Said variable capacitance C1 generated in this way is then able to be measured by measuring the variation in impedance of the circuit of the measuring means M2 in order to detect the approach of a part of the user's body, for example the approach of a hand M of the user toward the detection device D.

The NFC antenna A1 according to an aspect of the invention is thus able to generate a variation in capacitance in response to the approach of a body part of a user that is able to be measured by measuring a variation in impedance using the measuring means M2, which are designed to resonate at the same resonant frequency as said NFC antenna A1.

Figure 2:
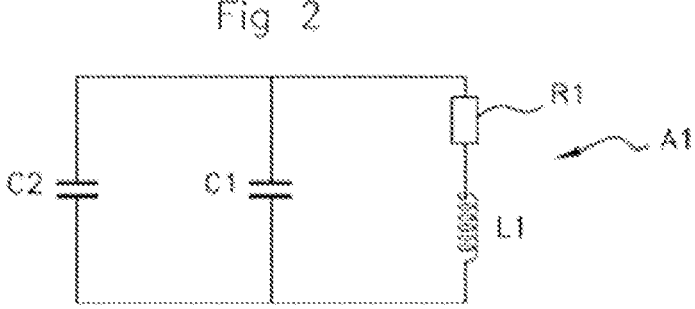
FIG. 2 is a circuit diagram of the near-field communication antenna modified according to an aspect of an aspect of the invention.

FIG. 2 schematically shows the equivalent circuit diagram of the NFC antenna A1 modified in this way. The circuit is a resistor, inductor and capacitor RLC circuit consisting of a first branch comprising a resistor R1, which represents the losses of the NFC antenna A1, connected to an inductor L1 (representing the NFC antenna A1), of a second branch comprising a capacitor C1 representing the variable capacitance of the electrode, and of a third, optional branch comprising an adjusting capacitor C2, all three branches being connected in parallel. The variable capacitance C1 is generated by virtue of the electrode connected in parallel to the NFC antenna A1 produced in the form of rods of the modified NFC antenna A1. The inductance of the inductor L1 and the capacitance of the capacitor C1 are adjusted such that the circuit consisting of L1 and C1 resonates at the 13.56 MHz parallel resonance.

The RLC circuit thus formed is sensitive not only to the approach of a portable user equipment 200, but also to the approach of a part of the user's body, for example their hand M.

Indeed, upon the approach of a portable user equipment 200, inductive coupling (between the NFC antenna of the portable user equipment and the NFC antenna A1 of the detection device D) and capacitive coupling between all types of material are created between said equipment 200 and the detection device D, causing the value of each of the three parameters to vary, that is to say the resistance of the resistor R1, the value of the variable capacitance C1 and the inductance of the inductor L1.

The variation of these three parameters R1, L1, C1 brings about a notable change in the impedance of the NFC antenna A1 and/or in its resonant frequency, that is to say a mismatching, which is transmitted inductively to the second antenna A2 and then measured by the measuring means M2.

Figure 8:
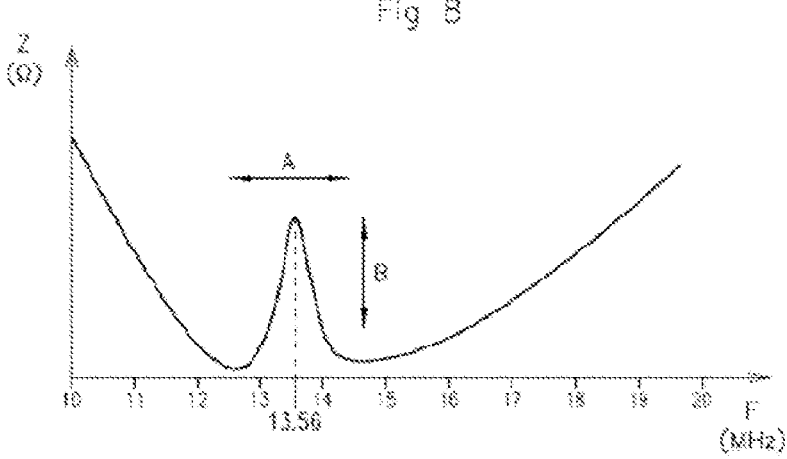
FIG. 8 is a graph showing the impedance of the communication antenna as a function of frequency, and the variations in impedance and/or in resonant frequency as a function of the approach of a part of the user's body or of a portable user equipment.

This is illustrated in FIG. 8, which shows the impedance Z measured by the measuring means M2 as a function of the resonant frequency F. The minimum impedance values correspond to the series resonant circuit of the second antenna A2 (or of the measuring means M2), and the impedance peak corresponds to the parallel resonance of the circuit of the modified NFC antenna A1.

The approach of a portable equipment 200 or of a hand M of a user generates a variation in impedance, represented by an arrow B in FIG. 8, and/or a variation in frequency, represented by an arrow A in FIG. 8.

The approach of a hand M of a user toward the detection device D generates capacitive coupling between the hand of the user and the NFC antenna A1 modified according to an aspect of the invention (in this case with the conductive surface of the rods), causing the value of the variable capacitance C1 to vary, thus impacting the resonant frequency and/or the impedance of the circuit of the NFC antenna A1.

FIG. 6 illustrates one preferred embodiment of the invention, in which there are five rods O1", O2", O3', N1", N2" of the NFC antenna A1" that are in parallel with one another and connected in parallel to the NFC antenna A1 at two connections J1", J2", one connection J1" of which is grounded. The rods O1", O2", O3" are connected to one another and connected to the point J1", and the rods N1", N2" are connected to one another and connected to the point J2". In this embodiment, the NFC antenna A1" is therefore connected in parallel with the variable capacitance C1 in the form of the five rods.

In FIG. 6, the NFC antenna A1" is connected in parallel to a third NFC antenna A3". This third NFC antenna A3" is positioned directly facing the second antenna A2 and is preferably of the same size as said second antenna A2. This third antenna A3" is therefore placed and dimensioned so as to increase the electromagnetic coupling efficiency between said third antenna A3" and the NFC antenna A1. This third antenna A3", which is optional, acts as a relay antenna between the NFC antenna A1 and the second antenna A2, and thus transmits any variation in frequency and/or in impedance of the NFC antenna A1 to the second antenna A2.

This third NFC antenna A3" may prove necessary when the size and/or the position of the NFC antenna A1 does not allow it to be positioned facing the second antenna A2 and does not allow efficient electromagnetic coupling between the two antennas. The addition of this third NFC antenna A3" then allows more efficient coupling. Of course, this third NFC antenna A3" may be connected in series with the NFC antenna A1".

Figure 3:
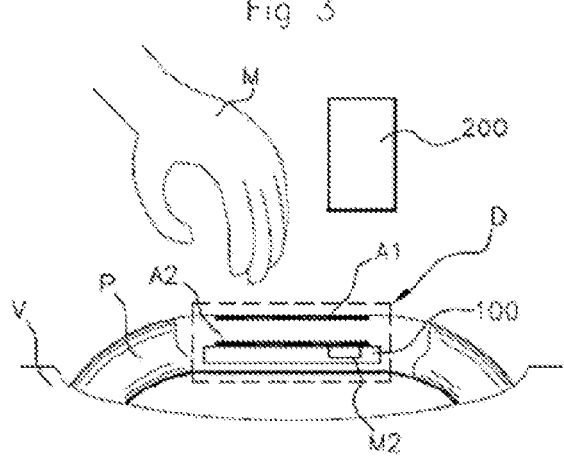
FIG. 3 is a schematic representation of a vehicle door handle comprising the detection device according to an aspect of the invention.

FIG. 3 shows a vehicle V door handle P comprising the detection device D according to an aspect of the invention. The modified NFC antenna A1 according to an aspect of the invention is preferably located on an inner surface of the handle, and the measuring means M2 are located on a printed circuit 100 contained within the handle P, the two antennas, the communication antenna A1 and the second antenna A2, preferably being located facing one another so as to create electromagnetic coupling that is as efficient as possible.

The NFC communication antenna A1 is preferably made of copper so as to be flexible, and may easily match the concave shape of the inner surface of a vehicle V door handle P.

It is also conceivable to arrange the constituent elements of the modified NFC antenna A1 on either side of a flexible printed circuit, for example the rods of the electrode are etched on one side of the printed circuit and the windings of the NFC antenna are etched on the other side of the printed circuit. Through-vias are then formed between the two elements, through the material of the printed circuit, to connect the rods to the windings. The flexible printed circuit is then bonded to an inner surface of the door handle P.

The detection device D thus makes it possible to detect the approach of a portable user equipment 200 and the approach of a hand M close to the handle P in order to unlock the door.

Figure 4:
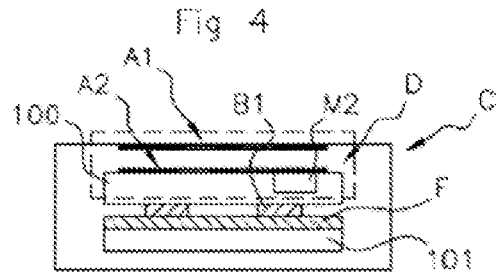
FIG. 4 is a schematic representation of an inductive charger for a portable user equipment comprising the detection device according to an aspect of the invention.

FIG. 4 shows an inductive charger C for a portable user equipment 200 comprising the detection device D according to an aspect of the invention. An aspect of the invention is also applicable to any NFC reader wherever it is located on the vehicle V, for example on the door pillars or in the rear-view mirrors.

The charger C comprises a first printed circuit 101 on which there is located for example a ferrite F, which is itself located below a charging coil B1. Above the charging coil B1 is a second printed circuit 100 comprising the measuring means M2 and on which the second antenna A2 is etched. The NFC communication antenna A1 modified according to an aspect of the invention for its part is located on the inner surface of the casing C, for example bonded or etched.

Similarly, the detection device D according to an aspect of the invention makes it possible to detect the approach of a hand M of a user and also the approach of a portable user equipment 200 close to or toward the charger C.

An aspect of the invention therefore cleverly makes it possible, by modifying the NFC communication antenna, to be able to carry out not only detection of an approach of a portable user equipment, but also detection of an approach of a hand of a user or any other object or any other materials by expediently using the parasitic capacitance of the antenna, the value of which is variable and is increased by modifying the footprint of the NFC antenna comprising comb-shaped protuberances generating said increase in parasitic capacitance. This invention is all the more noteworthy since the impedance measurement is sufficient to detect the approach of the hand and the approach of a portable user equipment, which was not possible in the prior art. The proximity of the communication antenna located at a distance from the measuring means but closer to the object to be detected allows more reliable detection and a significant space saving because the communication antenna is offset and no longer located on the printed circuit.

The invention claimed is:

1. A device for detecting an approach of a part of a user's body and/or of a portable user equipment, intended to be housed on board a motor vehicle, comprising:
   a) a near-field communication antenna (NFC) configured to transmit and receive signals at a high resonant frequency selected between 3 and 30 MHz, said NFC antenna comprising at least one winding that extends continuously in the form of a set of rods such that said rods have a variable capacitance connected to said NFC antenna and that said NFC antenna is able to generate a variation in capacitance in response to the approach of a part of a user's body; and
   b) measuring means for measuring, through electromagnetic coupling with said NFC antenna, a variation in impedance or a variation in frequency of said NFC antenna, the measuring means having a series resonant frequency at the selected high resonant frequency and being able to detect the approach of a portable user equipment or the approach of a part of the user's body.

2. The detection device as claimed in claim 1, wherein the rods are identical to one another.

3. The detection device as claimed in claim 1, wherein said NFC antenna comprises rods on two opposing sides of the perimeter.

4. The detection device as claimed in claim 1, wherein said NFC antenna comprises at least one winding that extends continuously in the form of a set of comb-shaped rods such that said rods have a variable capacitance connected in parallel to said NFC antenna.

5. The detection device as claimed in claim 1, wherein the measuring means comprise a second antenna electromagnetically coupled to the NFC antenna.

6. The detection device as claimed in claim 5, further comprising a third antenna connected in series to the NFC antenna and electromagnetically coupled to the second antenna.

7. A vehicle door handle, comprising a detection device as claimed in claim 1.

8. An inductive charger for a portable user equipment, comprising a detection device as claimed in claim 1.

9. A rear-view mirror for a motor vehicle, comprising a detection device as claimed in claim 1.

10. A motor vehicle, comprising a detection device as claimed in claim 1.

11. A device for detecting an approach of a part of a user's body and/or of a portable user equipment, intended to be housed on board a motor vehicle, comprising:

a) a near-field communication (NFC) antenna configured to transmit and receive signals at a high resonant frequency selected between 3 and 30 MHz, said NFC antenna comprising at least one winding that extends continuously in the form of a set of rods such that said rods have a variable capacitance connected to said NFC antenna and that said NFC antenna is able to generate a variation in capacitance in response to the approach of a part of a user's body; and b) measuring means for measuring, through electromagnetic coupling with said NFC antenna, a variation in impedance or a variation in frequency of said NFC antenna, the measuring means having a series resonant frequency at the selected high resonant frequency and being able to detect the approach of a portable user equipment or the approach of a part of the user's body, wherein the winding defines a perimeter within which said NFC antenna extends continuously in the form of a set of comb-shaped rods.

12. The detection device as claimed in claim 11, wherein, with the perimeter being rectangular, the rods are in the form of copper tracks perpendicular to a length or width of the perimeter.

\* \* \* \* \*